United States Patent
McNair

[11] Patent Number: 5,994,680
[45] Date of Patent: Nov. 30, 1999

[54] METHOD OF WELDING A HEATING ELEMENT TO A VESSEL FOR FORMING A HEATING CONTAINER

[75] Inventor: John Duncan McNair, Hong Kong, The Hong Kong Special Administrative Region of the People's Republic of China

[73] Assignee: Chiaphua Industries Limited, Shatin, The Hong Kong Special Administrative Region of the People's Republic of China

[21] Appl. No.: 09/095,518

[22] Filed: Jun. 10, 1998

[30]   Foreign Application Priority Data

Sep. 9, 1997 [GB] United Kingdom ................... 9719159

[51] Int. Cl.$^6$ ..................................................... H05B 6/12
[52] U.S. Cl. ........................... 219/617; 219/67; 219/536; 219/603; 219/635; 29/611
[58] Field of Search ..................................... 219/603, 604, 219/617, 616, 615, 635, 67, 61.2, 78.13, 601, 536, 542; 29/611, 592.1, DIG. 13, DIG. 4

[56]   References Cited

FOREIGN PATENT DOCUMENTS 162192   11/1985   European Pat. Off. .
798876   7/1958   United Kingdom .

Primary Examiner—Philip H. Leung
Attorney, Agent, or Firm—Jackson Walker, L.L.P.

[57]   ABSTRACT

An electric heating element having a central conductor and an outer metallic sheath is welded to a base of vessel to provide a heating container, for hot water in a domestic appliance for example. In order to carry out the welding, the vessel is heated up by an induction heater to a certain temperature and the temperature of the actual contacting welding surfaces raised above the certain temperature to a fusing temperature by applying and controlling electric power supplied to the conductor while the heating element is held firmly in position against the base.

9 Claims, 1 Drawing Sheet

METHOD OF WELDING A HEATING ELEMENT TO A VESSEL FOR FORMING A HEATING CONTAINER

BACKGROUND OF THE INVENTION

1. Field of the Invention

The invention relates to welding where components are joined together by heating component together to cause contacting surfaces to fuse and form a joint to hold the components together thereafter during normal use.

2. Description of Prior Art

Many vessels are used especially, but not exclusively, in domestic appliances to heat liquids, usually water, using an electric heating element. Conveniently for many applications, the heating element is attached directly to an outside surface of the vessel by some kind of welding process. In this way the heating element is conveniently supported by the vessel and provides a good conducting path for heat to enter the walls of the vessel. The vessels are made of metal and the electric element is insulated within a metal case or shield. It is already known to connect and fix the electric element to directly an outside surface of vessels by methods of hot welding. However, such methods are usually carried out in shrouded environments or furnaces so that each vessel, in a batch of vessels say, can be raised to the required temperatures, and held in contact with a respective electric heating element in the presence of a welding flux. Such methods are time consuming and must take place in a very carefully temperature controlled environment to avoid over-heating and possible permanent damage to either or both components.

SUMMARY OF THE INVENTION

It is an object of the invention to simplify the welding method to enable the welding to take place in particular on a generally open production line, if preferred.

According to the invention there is provided a method of heat welding a metallic sheathed heating element to a metal vessel comprising heating the vessel to a temperature around the welding point, firmly holding the heating element against a surface of the vessel and applying for a suitable time an electric current to the heating element to raise the temperature of metallic sheath and the contacted surface of the vessel to the welding temperatures to cause the contacting surfaces to fuse and weld together.

The method may comprise heating the inside of the vessel and welding the heating element to an outside surface of the vessel.

The heating element may be in the form of a circular flat coil. The coil may have two or more turns.

BRIEF DESCRIPTION OF THE DRAWINGS

A method of welding an electric heating element to a metallic vessel according to the invention will now be described by way of example with reference to the accompanying drawings in which.

DESCRIPTION OF THE PREFERRED EMBODIMENTS

Figure 1:
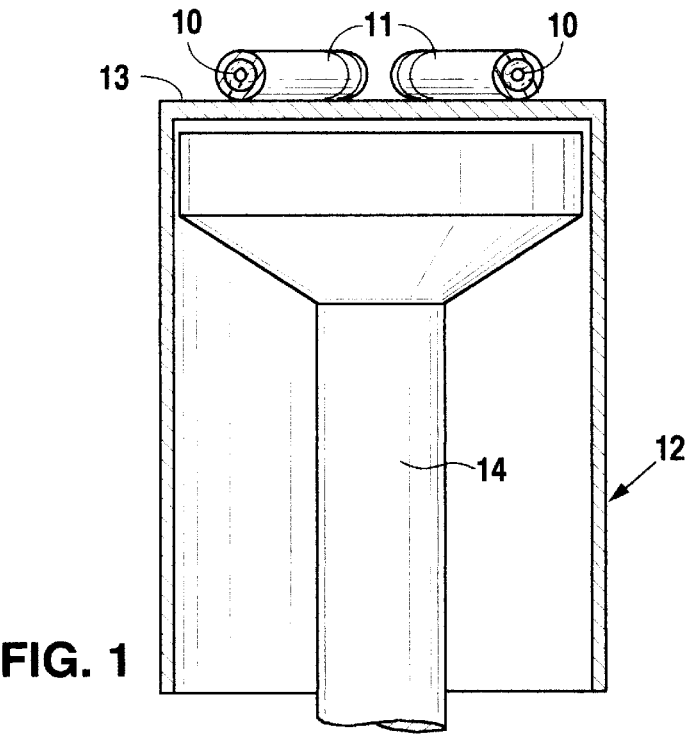
FIG. 1 shows a cross-sectional side view of the heating element and the vessel.
Figure 2:
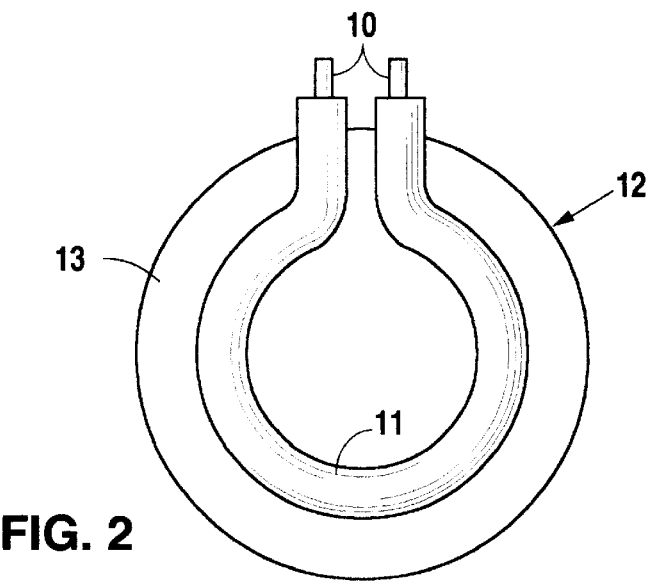
FIG. 2 shows an underplan view of the vessel.

Referring to the drawings, in FIGS. 1 and 2. a generally conventional electric heating element has a central conductor 10 surrounded by insulating material contained within an outer metallic sheath 11. A metallic vessel 12 has a base 13 which may be somewhat thicker than side walls of the vessel and/or provided with a bonded base plate if preferred. The heating element is welded to the base as shown.

In order to carry out the method, the vessel is heated by an induction heater 14, or similar, mounted inside the vessel but not necessarily in contact with the base of the vessel. The electric heating element is held in firm contact against the base of the vessel and electric power applied to the conductor 10 to heat the sheath 11, as well as the vessel surface that is in contact with the sheath, to cause the metals to melt and fuse as required to form a welded joint between them. As in normal welding, a suitable flux is pre-applied to the joining surfaces to assist the fusion and to inhibit metallic oxidation during the welding operation.

Typically for an aluminium sheath 11 and an aluminium vessel 12, the vessel is heated in practice to around 550° C. by the heater 14 and a voltage of around 35 volts is supplied to the heating element 10 for about 2 minutes. The power supplied to the heating element raises the temperatures at the contacting welding surfaces of the sheath and the base of the vessel to, say, 570° C. which allows and causes those contacting surfaces to fuse and so become welded to-ether when the power supply is cut-off and the contacting surfaces cool down.

Where other weldable materials are used somewhat different temperatures and cycle times for the method may be required. However, in all embodiments of the invention, it will be appreciated that generally no heat shrouds or environmental protection, for example a heat insulated confined heating chamber, are necessary. The vessel 12 will be effectively and efficiently heated without close intimate contacting with the heater 14 and so no precision fitting together is required. Also, the actual heating for creating the weld is directed very specifically at or in the contacting surfaces that are to be welded and the temperatures at such surfaces can be very easily controlled by using a rheostat or similar to control the applied power, in any event by relatively simple control of the electrical current through the conductor 10.

It will be appreciated that the heating element may be a coil shape as shown in FIG. 2 but may, where preferred, comprise a coil with two or more turns. As such, the base of the vessel may be formed without a bonded or "thickened" base plate mentioned above, which in the prior art is provided to spread heat out across the base 13 in use. It will be noted that the heating element may be attached to a top outer peripheral surface of a vessel 12, such as for use in a single loaf breadmaker. Indeed and generally, the relative position of joining the heating element to the vessel is not limited for embodiments of the invention; and if required. The heating element can be welded to an inside surface of the vessel.

Figure 3:
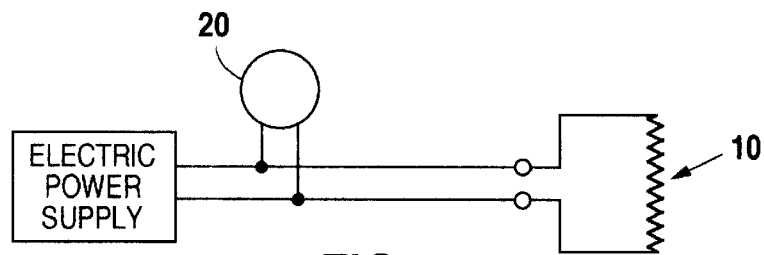
FIG. 3 shows an electrical schematic diagram for supplying electric power to the heating element when carrying out the method.

FIG. 3 illustrates an electrical schematic diagram for supplying electric power (electric power supply) to the heating element 10 when carrying out the method of the present invention. A rheostat 20 or similar device may be used to control the applied power.

We claim:

1. A method of heat welding a metallic sheathed heating element to a metal vessel comprising heating the vessel to a temperature around the welding point, firmly holding the heating element against a surface of the vessel and supplying for a predetermined time an electric current to the heating element by connecting the heating element to a power supply to raise the temperature of metallic sheath and the contacted surface of the vessel to the welding temperatures to cause the contacting surfaces to fuse and weld together.

2. A method according to claim 1, comprising heating the inside of the vessel and welding the heating element to an outside surface of the vessel.

3. A method according to claim 1, in which the heating element is in the form of a circular flat coil.

4. A method according to claim 3, in which the coil has at least two turns.

5. A heating container comprising:

a vessel having a peripheral surface and side walls, and a heating element having an outer metallic sheath, said element affixed to said peripheral surface by heating said vessel to temperature around said vessel's welding point, firmly contacting said element against said peripheral surface and supplying for a predetermined time an electric current to said element by connecting said element to a power supply to raise the temperature of said metallic sheath and said contacted surface of said vessel to the welding temperatures of said vessel and said sheath.

6. The heating container of claim 5 wherein said heating of said vessel occurs within an inner portion of said vessel and said element is affixed to an outside peripheral surface of said vessel.

7. The heating container of claim 5 wherein said element is a circular flat coil.

8. The heating container of claim 7 wherein said coil has at least two turns.

9. The heating container of claim 5 wherein said element is affixed to an inside peripheral surface of said vessel.

* * * * *